United States Patent
Zhu et al.

(10) Patent No.: US 11,620,450 B2
(45) Date of Patent: Apr. 4, 2023

(54) DEEP LEARNING BASED TEXT CLASSIFICATION

(71) Applicant: CHENGDU WANG'AN TECHNOLOGY DEVELOPMENT CO., LTD., Chengdu (CN)

(72) Inventors: Yongqiang Zhu, Chengdu (CN); Wencheng Wu, Chengdu (CN)

(73) Assignee: CHENGDU WANG'AN TECHNOLOGY DEVELOPMENT CO., LTD., Chengdu (CN)

(*) Notice: Subject to any disclaimer, the term of this patent is extended or adjusted under 35 U.S.C. 154(b) by 301 days.

(21) Appl. No.: 17/134,143

(22) Filed: Dec. 24, 2020

(65) Prior Publication Data
US 2022/0138423 A1    May 5, 2022

(30) Foreign Application Priority Data
Nov. 2, 2020    (CN) .......................... 202011203373.0

(51) Int. Cl.
*G06F 40/289*    (2020.01)
*G06N 3/08*    (2023.01)
*G06N 3/047*    (2023.01)

(52) U.S. Cl.
CPC .......... *G06F 40/289* (2020.01); *G06N 3/047* (2023.01); *G06N 3/08* (2013.01)

(58) Field of Classification Search
CPC ... G10L 15/1815; G10L 15/063; G10L 15/16; G10L 15/187; G10L 19/0018; G06N 3/049; G06N 3/0472; G06N 3/08; G06F 40/289

See application file for complete search history.

(56) References Cited

U.S. PATENT DOCUMENTS

| | | | |
|---|---|---|---|
| 2017/0148433 A1* | 5/2017 | Catanzaro | G06N 3/084 |
| 2018/0366013 A1* | 12/2018 | Arvindam | G06F 40/237 |
| 2021/0065569 A1* | 3/2021 | Arvindam | G06F 40/30 |

* cited by examiner

*Primary Examiner* — Bhavesh M Mehta
*Assistant Examiner* — Edward Tracy, Jr.

(57) ABSTRACT

Disclosed of the present application is relation to deep learning based text classification. The training corpus is screened by key clauses according to the weights of clauses in the training corpus, so as to keep the complete sentence and the original word order as much as possible according to the language habits. Thus, the deep learning model can learn normal semantic features. In addition, the subsample sets corresponding to different preset word length intervals is obtained from the training sample set, and each subsample set is putted into the deep learning model for training, so that several text classification models corresponding to different preset word length intervals can be obtained for text classification. Therefore, the deep learning models can be self-adaptively selected to classify texts based on the above mentioned multiple word length intervals and multi-model training method, to improve text classification accuracy.

17 Claims, 8 Drawing Sheets

A training corpus set is processed to construct a word weight table corresponding to the training corpus set — S110

A clause weight of each of clauses in each training corpus is computed, and key clauses of each training corpus are screened according to the clause weight, to obtain a training sample set composed of the key clauses screened from each training corpus — S120

Subsample sets corresponding to different preset word length interval are acquired from the training subsample set, and the subsample sets are respectively inputted into a deep learning model for training, to obtain text classification models corresponding to different word length intervals — S130

Inputted texts are classified by using the text classification models — S140

DEEP LEARNING BASED TEXT CLASSIFICATION

CROSS-REFERENCE TO RELATED APPLICATIONS

This application claims priority to Chinese Patent Application No. 202011203373.0 filed on Nov. 2, 2020, the contents of which are incorporated by reference herein.

FIELD

The subject matter herein generally relates to text analysis and processing technology, and particularly to deep learning based text classification.

BACKGROUND

With the development of computer technology becoming more and more mature, the Internet is becoming inseparable from the lives of users. And network devices include various of terminals such as mobile phones, table computers, servers, rather than traditional personal computers only. Further, with the development of related technologies, various of smart devices will involve into IOT (Internet of Things) era, and the text information in the network is exploding under the background of IoE (Internet of Everything). The advent of the era of big data means that data is fortune, but unstructured textual information has no value at all. In view of the above, an important problem is how to classify these text information.

BRIEF DESCRIPTION OF THE FIGURES

Implementations of the present disclosure will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like.

Generally, text classification technology was first applied to the news industry, in which the category or the news' was distinguished by using strict structural contribution management. For instance, product information on e-commerce platforms, a large number of e-mails, public articles on social platforms, speeches published on various forums, text descriptions of pictures and videos, etc., are all manifestations of the huge number of text information on the Internet which are strictly difficult to classify by manual or institutional management. The automatic text classification technology can effectively manage the classification of the products on e-commerce platforms, which can automatically classify the products into different category labels when the merchant releases the products, thereby helping the e-commerce platforms to management product resources, excavating user interests. Similar usage of the above mentioned automatic text classification can be extended to all walks of life. With the rapid development of data mining technology, the user of classification technology can achieve structured data, which is also of great help to text analysis and public opinion analysis in various fields.

Due to Chinese has the characteristics of having large character set and too many word combinations, needing word segmentation, and complex semantics, many solutions in related technologies are not applicable in the Chinese environment. According to the research of the inventor of this application, there are two main types of solutions for text classification currently used.

The first solution is based on traditional machine learning. This method generally includes text segmentation to remove stop words, text feature word selection, construction of text representation and construction of classifiers. The Chinese word segmentation technology can include, such as, stuttering word segmentation, Thunlac, Hanlp, etc. Commonly used algorithms for selecting Chinese feature words include DF algorithm, CHI algorithm, MI algorithm, and IG algorithm. The commonly used method of text representation is by using VSM space vector, in which the space vector is constructed by taking the feature words as the dimension and the TF-IDF of the feature word as the weight to represent a text. Algorithms for constructing classifiers may include, but are not limited to, Naive Bayes classification, KNN, decision tree, SVM, neural network, and so on. Although there have been great advances and breakthroughs in the research of machine learning methods, the text classification model constructed by the traditional solution can only be applied to a part of situations, such as the situations with large feature discrimination between category labels, or the situations of rough classification scenarios. For scenes overlapping features exist among category labels and difficult to distinguish, or scenes with a large number of category labels and fine classification granularity, the effect of the traditional solution is often poor. The inventor's research found that the main reason lies in the fact that when the number of category labels increases, the selected feature set must also increase, and ultra-high dimensions have a huge loss in time and space performance, while the accuracy and recall rate of text classification may not increase as performance decreases. Therefore, the text classification method based on traditional machine learning will no longer applicable.

The second solution is based on deep learning, which is different from the manual feature selection of machine learning in the first solution. The deep learning model only needs to input the original features of the training corpus to automatically learn the text features and apply them into text classification to obtain the classification result. In related technologies, text classification models based on deep learning include, for example, TextCnn, RCNN, RNN+Attention. With regard to the text classification method based on deep learning, the accuracy and recall rate of text classification can greatly improved.

With reference to the problems mentioned in the paragraph of the background, the deep learning model is usually a network model constructed from a static graph. After the training is completed, the input and output sizes of each layer of the network are fixed. However, in the actual text classification environment, the text length is usually not fixed, therefore some text content need to be discarded in the text classification process, and only part of the text content is inputted into the text classification model for classification.

However, the inventor of the present application found that the characteristic of deep learning lies in the ability to learn semantic features. If the input words in the text are deleted, the semantics of the word segmentation sequence of the inputted text may be incomplete, which may result in abnormal semantic features are learned by the deep learning model.

In addition, the deep learning methods in related technologies usually depends on the feature of the text length. When the text to be classified with a long text length is input, misrecognition may happen which will affect the classification accuracy.

In view the above mentioned reasons, based on the discovery of the above technical problems, the following technical solutions to solve the above problems are provided. It should be noted that the defects in the above-mentioned prior art solutions are due to practice and careful research of the inventors. Therefore, the discovery of the above problems and the solutions proposed by the embodiments of the application below to solve the above problems should be the contributions made by the inventor to the application, therefore it should not be understood as the technical content known to those skilled in the art.

Figure 1:
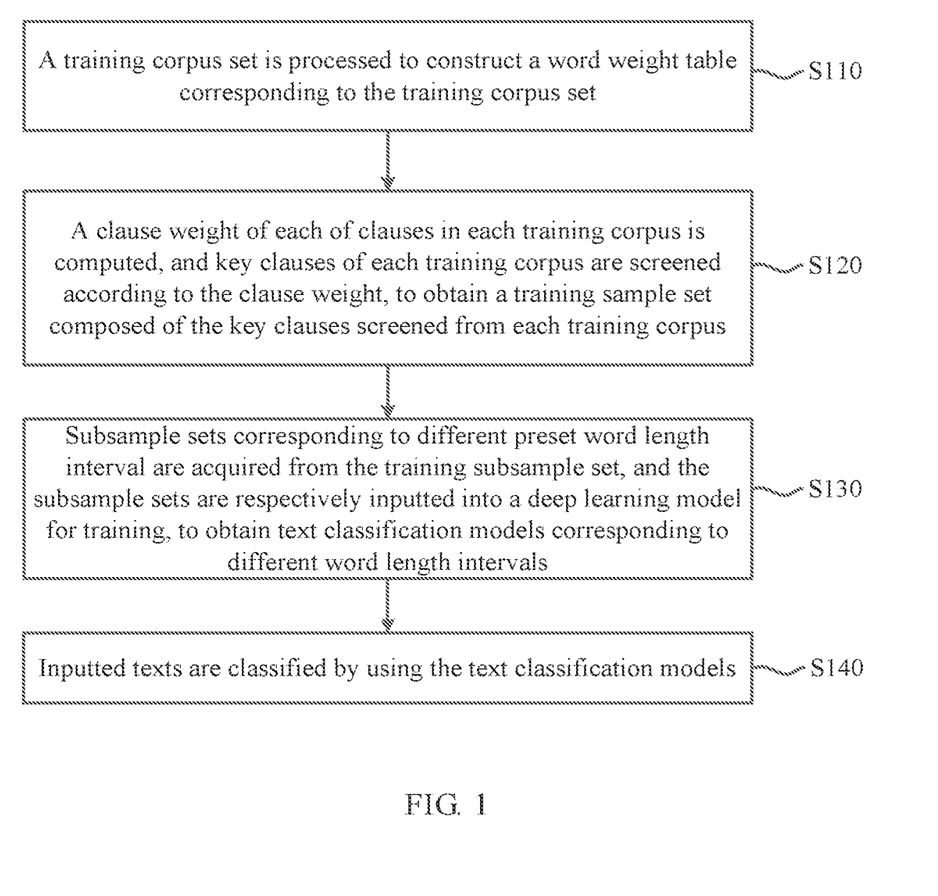
FIG. 1 illustrates a schematic flowchart of a deep learning based text classification method according to an embodiment of the present application.

FIG. 1 shows a schematic diagram of a process of a deep learning based text classification method which can be implemented by a server according to one embodiment of the present application. It should be understood that, in other embodiments, the order of some steps of the method of this embodiment can be exchanged, or some of the steps can also be omitted or deleted. The detail of the deep learning based text classification method are introduced as follows.

At block S110, a training corpus set is processed to construct a word weight table corresponding to the training corpus set. In this embodiment, the training corpus set may be composed of a plurality of training corpora.

At block 120, a clause weight of each of clauses in each training corpus is computed, and key clauses of each training corpus are screened according to the clause weight, to obtain a training sample set composed of the key clauses screened from each training corpus.

At block S130, subsample sets corresponding to different preset word length intervals are acquired from the training subsample set, and the subsample sets are respectively inputted into a deep learning model for training, to obtain text classification models corresponding to different word length intervals.

At block S140, inputted texts are classified by using the text classification models.

Based on the above method, in this embodiment, the training corpus is screened by key clauses according to the weights of clauses in the training corpus to obtain the training sample set composed of the training corpus after the key clause screening, so as to keep the complete sentence and the original word order as much as possible according to the language habits. Thus, by selecting key clauses based on clause weights for subsequent text classification training, the deep learning model can learn normal semantic features. On this basis, by obtaining the subsample sets corresponding to different preset word length intervals in the training sample set, and by inputting each subsample set into the deep learning model for training, text classification models corresponding to different preset word length intervals are obtained. Therefore, the deep learning models can be self-adaptively selected to classify texts based on the above mentioned multiple word length intervals and multi-model training method, to improve text classification accuracy.

Figure 2:
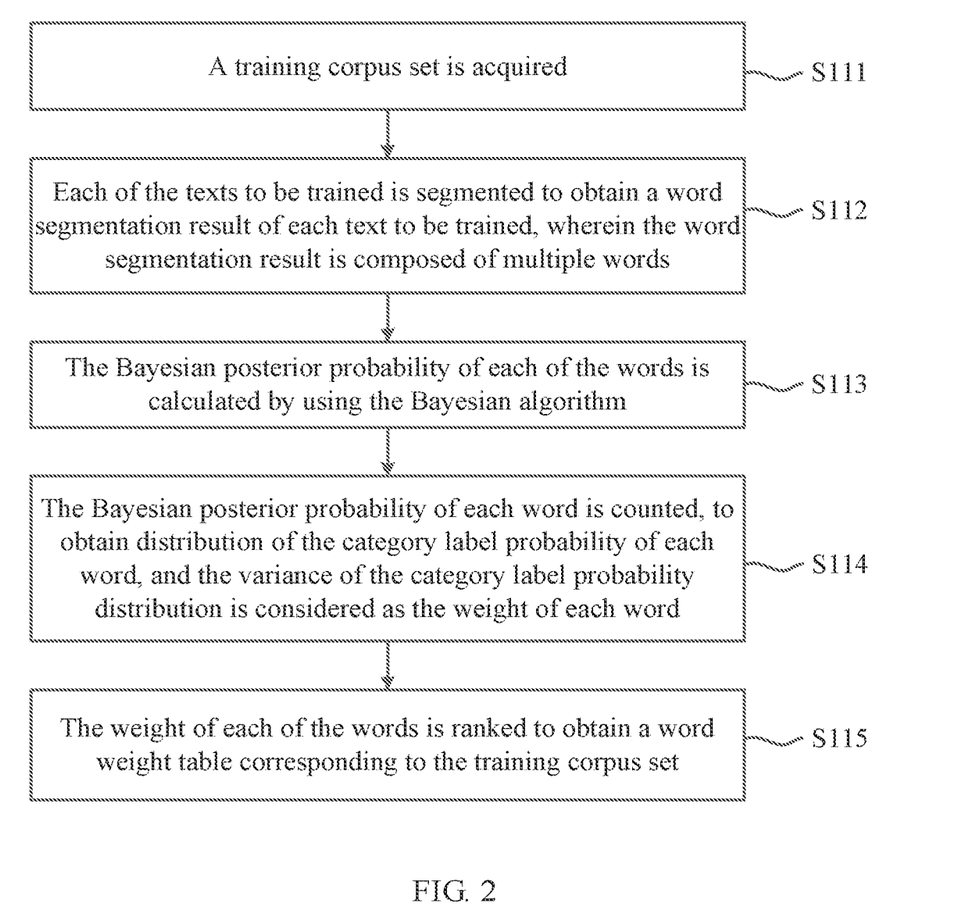
FIG. 2 illustrates a schematic flowchart of block S110 of FIG. 1.

In one embodiment, the block S110 can be implemented by the sub-blocks as shown in FIG. 2, which are described in detail as follows.

At sub-block S111, a training corpus set is acquired. In this embodiment, each corpus of the training corpus set can include texts to be trained and category labels of the texts to be trained. The texts to be trained can be obtained from various data sources, such as, but not limited to, product information on e-commerce platforms, a large number of emails, public account articles on social platforms, speeches published on various forums, text descriptions of pictures and videos, etc. The category labels can refer to the type of the texts to be trained. For instance, for the product information on the e-commerce platforms, the category labels can be product types corresponding to different products.

At sub-block S112, each of the texts to be trained is segmented to obtain a word segmentation result of each text to be trained, wherein the word segmentation result is composed of multiple words.

In this embodiment, the texts to be trained can be segmented by a predetermined word segmentation tool, to translate the texts to be trained into word segmentation sequences each of which include a plurality of numbered words.

At block S113, the Bayesian posterior probability of each of the words is calculated by using the Bayesian algorithm.

Wherein the Bayesian posterior probability can be used to represent the probability that when a target word appears, the text to be trained corresponding to the target word is each category label. For example, when a target word X appears, the text to be trained corresponding to the target word X maybe Y, the Bayesian posterior probability can be used to represent the probability that the text Y is "news". The "news" may be one of the category labels.

In a possible example, the Bayesian posterior probability of each word can be obtained by the following exemplary calculation formula:

$$P(C_m \mid x_k) = \frac{P(x_k \mid C_m)P(C_m)}{P(x_k)},$$

wherein $C_m$ represents the m-th category label, $X_k$ represents the k-th word, $P(C_m)$ represents the posterior probability of the category label $C_m$. $C_m|X_k$ represents the proportion of category texts to total texts. Further, $P(x_k)=\Sigma_{m=1}^{M} P(C_m)P(x_k|C_m)$. The Likelihood probability $P(X_k|C_m)$ can be calculated using the following formula:

$$P(x_k \mid C_m) = \frac{1 + W_{km}}{|V| + \sum_{k=1}^{K}\sum_{m=1}^{m} W_{km}}$$

wherein $W_{km}$ represents the number of the word $X_k$ occurrences in the category label $C_m$. In the formula, the numerator counts the total number of word $X_k$ appears in all texts having the category label $C_m$, and the denominator counts the total number of all words in the category label $C_m$. The constant "1" in the numerator and $|V|$ both are Laplace smoothing coefficients, V is the total number of words in a predetermined vocabulary, in order to prevent the occurrence of 0 probability, and to ensure that the sum of probabilities is 1.

At sub-block S114, the Bayesian posterior probability of each word is counted, to obtain distribution of the category label probability of each word, and the variance of the category label probability distribution is considered as the weight of each word.

In this embodiment, after the Bayesian probability calculation is completed, the probability distribution of a category label will be obtained for each word, and the variance D of the probability distribution is taken as the weight of the word. A formula for calculating the variance D is as follows:

$$D_k = \frac{\sum_{m=1}^{M}(P_{km} - \overline{P_k})^2}{1 + M}.$$

Wherein the variance of the probability distribution indicates the degree of dispersion of the probability distribution of the category label. The degree of dispersion is greater, the distinguishing ability of the category label corresponding to the probability distribution is greater.

At sub-block S115, the weight of each of the words is ranked to obtain a word weight table corresponding to the training corpus set.

Figure 3:
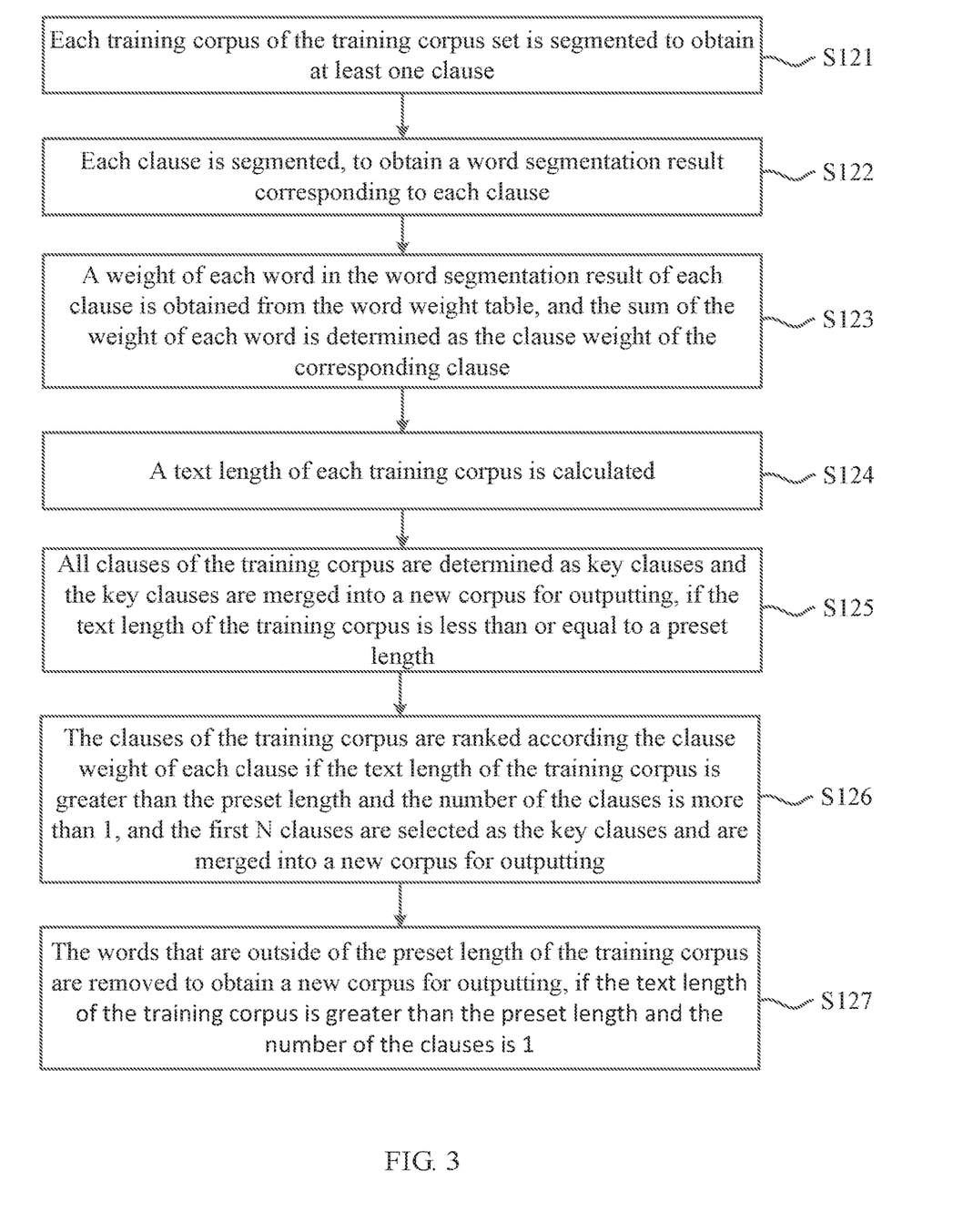
FIG. 3 illustrates a schematic flowchart of block S120 of FIG. 1.

In one embodiment, the block S120 can be implemented by the sub-blocks as shown in FIG. 3, which are described in detail as follows.

At sub-block S121, each training corpus of the training corpus set is segmented to obtain at least one clause.

For instance, each training corpus of the training corpus can be segmented according to punctuations (e.g., ".", "!", "?", ";"). If the training corpus does not contain any punctuation, the training corpus can be segmented according to line breaks.

At sub-block S122, each clause is segmented, to obtain a word segmentation result corresponding to each clause.

At sub-block S123, a weight of each word in the word segmentation result of each clause is obtained from the word weight table, and the sum of the weight of each word is determined as the clause weight of the corresponding clause.

In this embodiment, each clause can be translated into a numbered word sequence according to the word segmentation result and the dictionary by using the same word segmentation tool (e.g., tokenizer) aforementioned for constructing the word weight table. The numbered word sequence can be composed of a plurality of words which are numbered by numerals. Thereafter, the clause weight of each clause which is the sum of the weights of all words in the clause can be calculated.

In one embodiment, in order to preserve the complete sentence and original word order as much as possible according to language habits, key clauses are selected based on clause weight for subsequent text classification training, so that the deep learning model can learn normal semantic features. In this basis, the block S120 can be implemented according to the sub-blocks shown in FIG. 3 which are described in detail as follows.

At sub-block S124, a text length of each training corpus is calculated.

In this embodiment, the text length can be the total number of words of all clauses in the training corpus. For example, if the total number of the words of all clauses in the training corpus is 200, then the text length of the training corpus is 200 accordingly.

At sub-block S125, all clauses of the training corpus are determined as key clauses and the key clauses are merged into a new corpus for outputting, if the text length of the training corpus is less than or equal to a preset length.

At sub-block S126, the clauses of the training corpus are ranked according the clause weight of each clause if the text length of the training corpus is greater than the preset length and the number of the clauses is more than 1, and the first N clauses are selected as the key clauses and are merged into a new corpus for outputting.

Wherein, it should be understood that N is a positive integer, and the text length of the outputted new corpus is not greater than the preset length.

At sub-block S127, if the text length of the training corpus is greater than the preset length and the number of the clauses is 1, the words that are outside of the preset length of the training corpus are removed to obtain a new corpus for outputting.

Based on the above sub-blocks, the complete sentence and original word order can be preserved according to the language habits, and the deep learning model can learn normal semantic features by selecting the key clauses based on the clause weights for subsequent text classification training.

Figure 4:
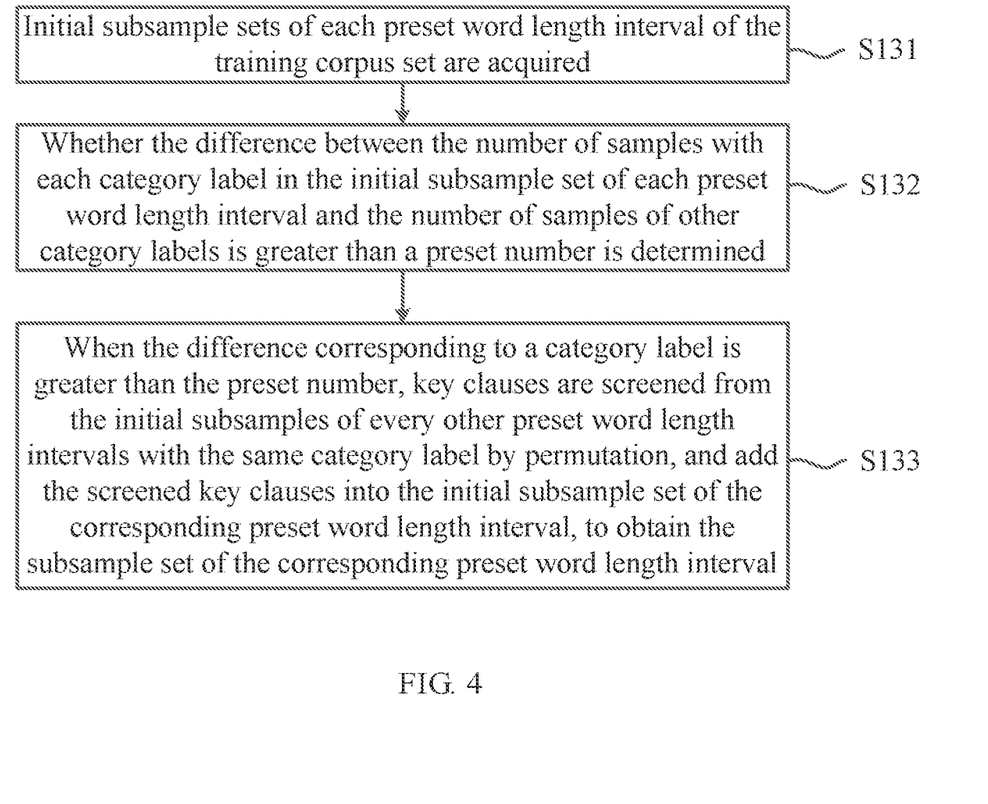
FIG. 4 illustrates a schematic flowchart of block S130 of FIG. 1.

In one embodiment, the process of acquiring subsample sets corresponding to different preset word length interval of block S130 can include the sub-blocks as shown in FIG. 4, which are described in detail as follows.

At sub-block S131, initial subsample sets of each preset word length interval of the training corpus set are acquired. For instance, the preset word length intervals may include, (0, 100], (100, 200], (200, 300], (300, 400], (400, 500], etc. The initial subsample set of the word length interval (0, 100] may be composed of training corpora of the training corpus set each of which having a word length located in the word length interval (0, 100].

At sub-block S132, whether the difference between the number of samples with each category label in the initial subsample set of each preset word length interval and the number of samples of other category labels is greater than a preset number is determined.

At sub-block S132, when the difference corresponding to a category label is greater than the preset number, key clauses are screened from the initial subsamples of every other preset word length intervals with the same category label by permutation, and add the screened key clauses into the initial subsample set of the corresponding preset word length interval, to obtain the subsample set of the corresponding preset word length interval.

In this embodiment, in order to ensure the training effect and avoid the large difference in the number of samples of different types of category labels in each preset word length interval from affecting the training effect of the subsequent training process, each training sample of the same preset word length interval should ensure that the number of samples for each category label remains uniform. For example, it can be determined whether the difference between the number of samples of each category label in the initial subsample set of each preset word length interval and the number of samples of other category labels is greater than the preset number, when the difference is greater than the preset number, the key clause screening can be implemented to ensure even number of short texts. When the number of long texts is not uniform, other short texts with the same category label through the clauses obtained by screening key clauses can be permutated to obtain long text samples, and add them to the corresponding subsample set of the corresponding word length interval.

On this basis, each subsample set can be respectively inputted into the deep learning mode for training, to obtain different text classification models with different preset word length intervals. For example, each subsample set can be respectively inputted into the deep learning model for semantic feature extraction and category label prediction. And then, the loss function value based on the predicted category label and the original labeled category can be computed, to continuously update the model parameters of the deep learning model for subsequent iterative training. When the training termination condition is met, the corresponding text classification models can be outputted. In this way, the different deep learning models after training can be adaptively selected to classify different texts having different text lengths by multi-model training of multiple word length intervals, therefore the classification accuracy is improved.

In one embodiment, with regard to the block S140, two exemplary implementations are provided for text classification, in order to meet different application scenarios.

Figure 5:
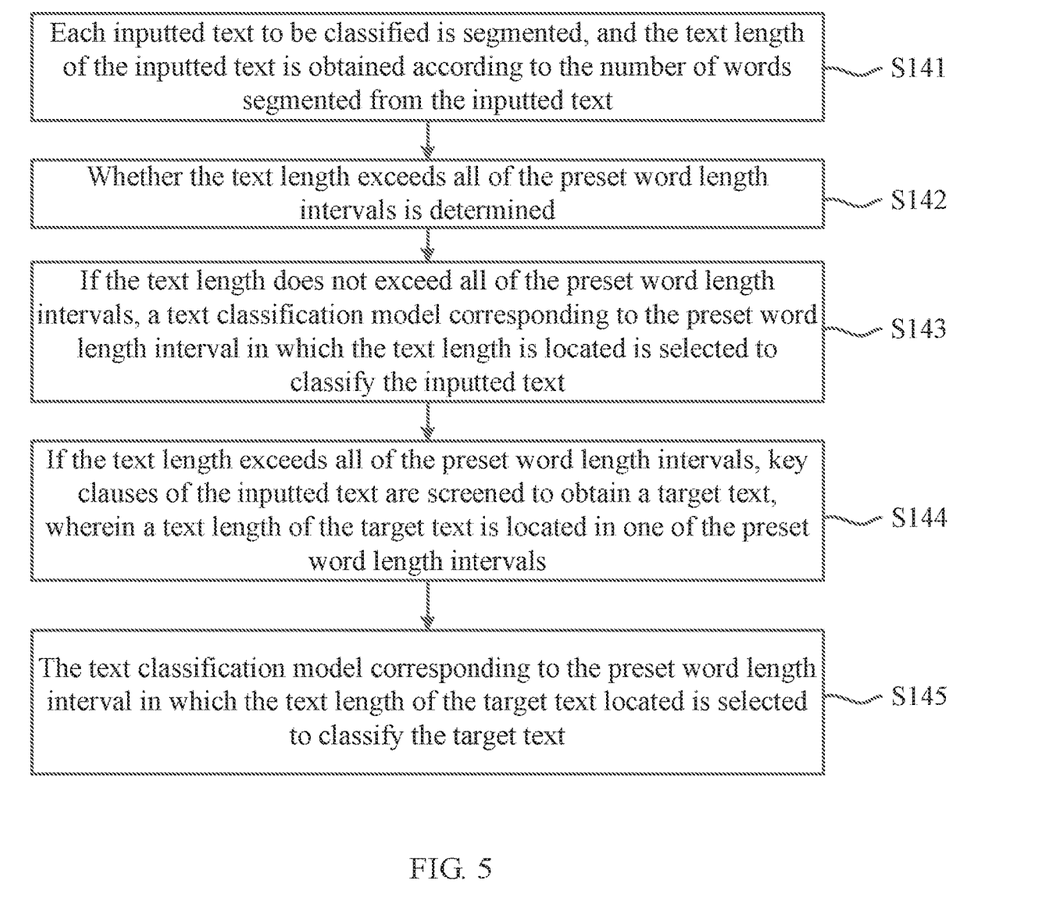
FIG. 5 illustrates a schematic flowchart of block S140 of FIG. 1 in one embodiment.

For example, with regard to scenarios where the length of the text to be classified is generally short and the accuracy requirements are reduced, the block S140 can be implemented by the sub-blocks as shown in FIG. 5, which are described in detail as follows.

At sub-block S141, each inputted text to be classified is segmented, and the text length of the inputted text is obtained according to the number of words segmented from the inputted text.

At sub-block S142, whether the text length exceeds all of the preset word length intervals is determined.

At sub-block S143, if the text length does not exceed all of the preset word length intervals, a text classification model corresponding to the preset word length interval in which the text length is located is selected to classify the inputted text, to obtain a text classification result of the inputted text.

For instance, if the preset word length intervals respectively are (0, 100], (100, 200], (200, 300], (300, 400], (400, 500], and the text length of the inputted text located in one of these intervals, such as (300, 400], then the text classification model corresponding to the interval (300, 400] is selected to classify the inputted text.

At sub-block S144, if the text length exceeds all of the preset word length intervals, key clauses of the inputted text are screened to obtain a target text, wherein a text length of the target text is located in one of the preset word length intervals.

At sub-clock S145, the text classification model corresponding to the preset word length interval in which the text length of the target text located is selected to classify the target text.

For example, if the text length of the inputted text exceeds the interval of (0, 500], the key clauses of the inputted text are screened to obtain the target text, and the text length of the target text is located in one of the preset word length intervals of (0, 100], (100, 200], (200, 300], (300, 400], (400, 500], such as (400, 500]. Thus, the text classification model corresponding to the interval (400, 500] can be selected for text classification, to obtain the text classification result of the inputted text.

Figure 6:
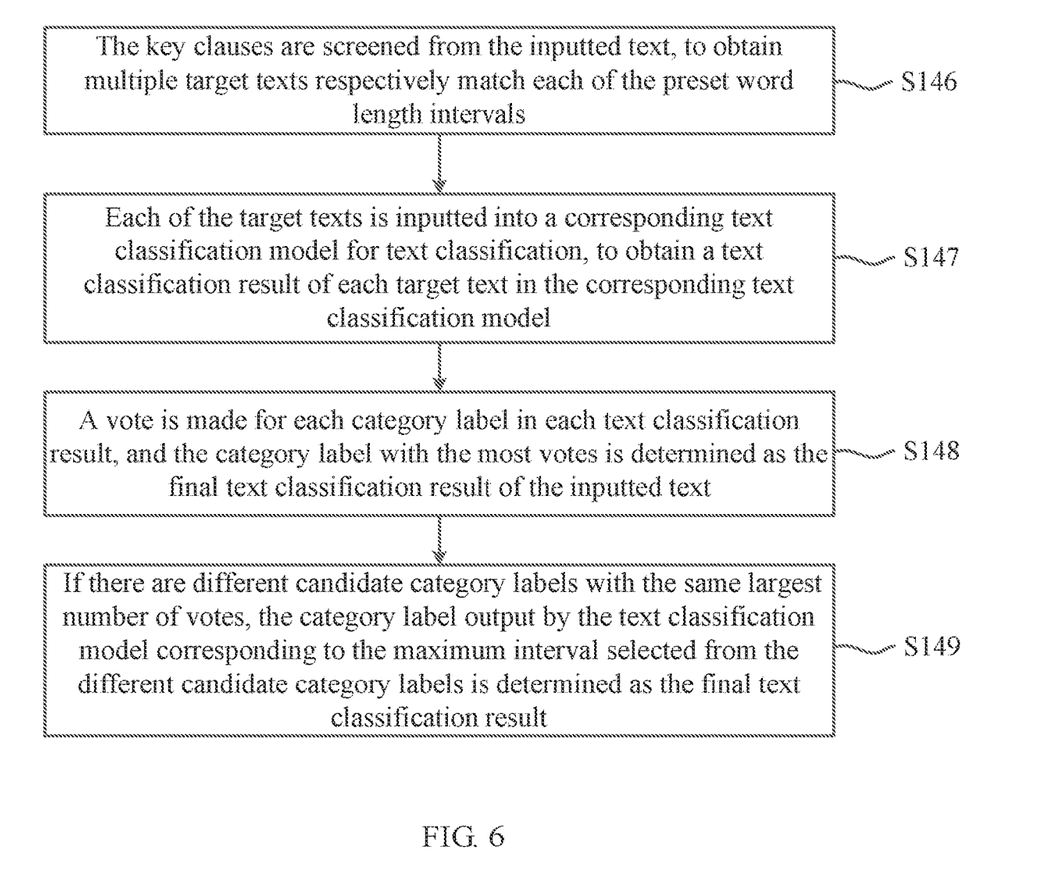
FIG. 6 illustrates a schematic flowchart of block S140 of FIG. 1 in another embodiment.

In another example, with regard to the application scenario with a long text length and high classification accuracy requirements, the block S140 can be implemented by the sub-blocks as shown in FIG. 6, which are described in detail as follows.

At sub-block S146, the key clauses are screened from the inputted text, to obtain multiple target texts respectively match each of the preset word length intervals.

At sub-block S147, each of the target texts is inputted into a corresponding text classification model for text classification, to obtain a text classification result of each target text in the corresponding text classification model.

For example, the key clauses can be screened from the inputted text to text multiple target texts each of which having a text length respectively matches the word length intervals of (0, 100], (100, 200], (200, 300], (300, 400], (400, 500]. Then, the target text whose text length matches (0, 100] is inputted into the text classification model corresponding to the interval of (0, 100], the target text whose text length matches (100, 200] is inputted into the text classification model corresponding to the interval of (100, 200], the target text which text length matches (200, 300] is inputted into the text classification model corresponding to the interval of (200, 300], the target text which text length matches (300, 400] is inputted into the text classification model corresponding to the interval of (300, 400], and the target text which text length matches (400, 500] is inputted into the text classification model corresponding to the interval of (400, 500], to obtain multiple text classification results respectively corresponding to the intervals of (0, 100], (100, 200], (200, 300], (300, 400], (400, 500].

At sub-block S148, a vote is made for each category label in each text classification result, and the category label with the most votes is determined as the final text classification result of the inputted text.

For example, each category label in the text classification results of the text classification models corresponding to the intervals of (0, 100], (100, 200], (200, 300), (300, 400], (400, 500), if a category label A has the largest number of votes, then the category label A is determined as the final text classification result of the inputted text.

At sub-block S149, if there are different candidate category labels with the same largest number of votes, the category label output by the text classification model corresponding to the maximum interval selected from the different candidate category labels is determined as the final text classification result.

For example, if there are two candidate category labels B and C with the same largest number of votes, and the candidate category label B is the text classification result of the text classification model corresponding to the interval (300, 400), and the candidate category label C is the text classification result of the text classification model corresponding to the interval (400, 500), then the candidate category label C can be selected and determined as the final text classification result of the inputted text.

Figure 7:
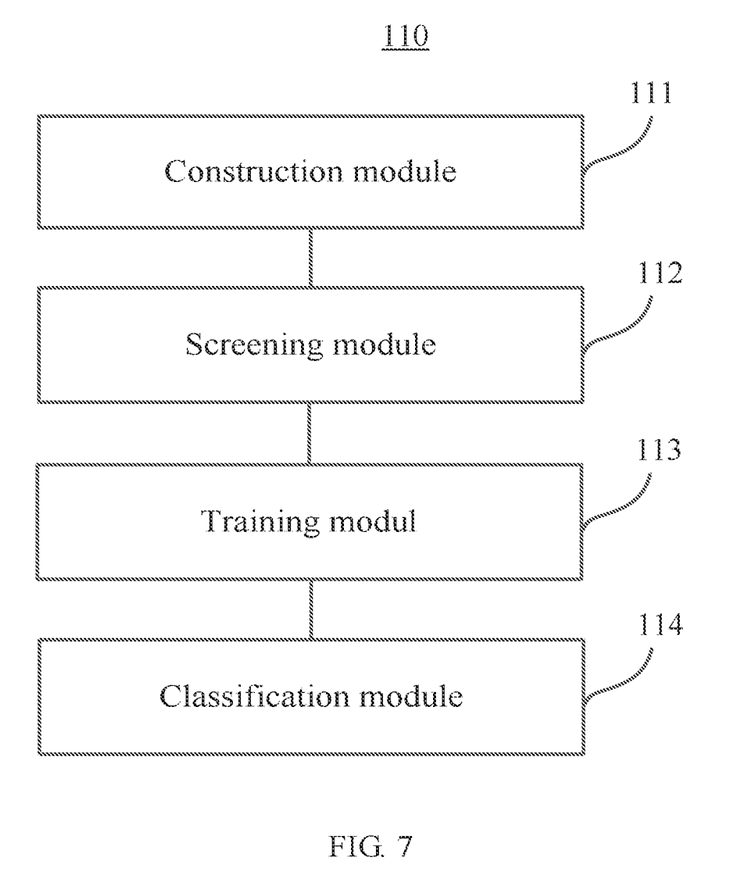
FIG. 7 illustrates a block diagram of a deep learning based text classification apparatus according to one embodiment of the present application.

Based on the same inventive concept, please refer to FIG. 7, which shows a schematic diagram of the functional modules of a deep learning based text classification device 110 provided by an embodiment of the present application. In this embodiment, the deep learning based text classification device 110 can be divided into multiple functional modules according to the method embodiment executed by the server. For example, the function modules may be divided to respectively correspond the functions defined by the above mentioned method, or two or more functions may be integrated into one functional module. The above-mentioned integrated modules can be implemented in the form of hardware or software functional modules. It should be noted that the division of the modules in the embodiments of the present application is illustrative, and is only a logical functional division, and there may be other division methods in actual implementation. For example, in the case of dividing each functional module corresponding to each function of the method, the deep learning based text classification device 110 shown in FIG. 7 can include a construction module 111, a screening module 112, a training module 113, and a classification module 114. The functions of each functional module of the deep learning based text classification device 110 will be described in detail below.

The construction module 111 processes a training corpus set to construct a word weight table corresponding to the training corpus set. It should be understood that, the construction module 111 can be configured to execute the above mentioned block S110 of the deep learning based text classification method. More details with regard to the construction module ill can refer to the above-mentioned content related to the block S110.

The screening module 112 computes a clause weight of each of clauses in each training corpus, and screens key clauses of each training corpus according to the clause weight, to obtain a training sample set composed of the key clauses screened from each training corpus. It should be understood that, the screening module 112 can be configured to execute the above mentioned block S120 of the deep learning based text classification method. More details with regard to the screening module 112 can refer to the above-mentioned content related to the block S120.

The training module 113 acquires subsample sets corresponding to different preset word length interval from the training sample set, and respectively inputs the subsample sets into a deep learning model for training, to obtain text classification models corresponding to different word length intervals. It should be understood that, the training module 113 can be configured to execute the above mentioned block S130 of the deep learning based text classification method. More details with regard to the training module 113 can refer to the above-mentioned content related to the block S130.

The classification module 114 classifies inputted texts by using the text classification models. It should be understood that, the classification module 114 can be configured to execute the above mentioned block S140 of the deep learning based text classification method. More details with regard to the classification module 114 can refer to the above-mentioned content related to the block S140.

In one embodiment, the construction module 111 further:

acquires a training corpus set, wherein each corpus of the training corpus set can include texts to be trained and category labels of the texts to be trained;

segments each of the texts to be trained to obtain a word segmentation result of each text to be trained, wherein the word segmentation result is composed of multiple words;

calculates the Bayesian posterior probability of each of the words by using the Bayesian algorithm;

counts the Bayesian posterior probability of each word, to obtain distribution of the category label probability of each word, wherein the variance of the category label probability distribution is considered as the weight of each word, and wherein the variance of the probability distribution indicates the degree of dispersion of the probability distribution of the category label, where the degree of dispersion is greater, the distinguishing ability of the category label corresponding to the probability distribution is greater; and ranks the weight of each of the words to obtain a word weight table corresponding to the training corpus set.

In one embodiment, the screening module 112 further:

segments each training corpus of the training corpus set to obtain at least one clause;

segments each clause to obtain a word segmentation result corresponding to each clause; and obtains a word weight of each word in the word segmentation result of each clause from the word weight table, and determines the sum of the weight of each word as the clause weight of the corresponding clause.

In one embodiment, the screening module 112 further:

calculates a text length of each training corpus;

determines all clauses of the training corpus as key clauses and merges the key clauses into a new corpus for outputting, if the text length of the training corpus is less than or equal to a preset length;

ranks the clauses of the training corpus according the clause weight of each clause if the text length of the training corpus is greater than the preset length and the number of the clauses is more than 1, and selects the first N clauses as the key clauses and merges the key clauses into a new corpus for outputting: and removes the words that are outside of the preset length of the training corpus to obtain a new corpus for outputting, if the text length of the training corpus is greater than the preset length and the number of the clauses is 1.

In one embodiment, the training module 113 further:

acquires initial subsample sets of each preset word length interval of the training corpus set;

determines whether the difference between the number of samples with each category label in the initial subsample set of each preset word length interval and the number of samples of other category labels is greater than a preset number; and screens key clauses from the initial subsamples of every other preset word length interval with the same category label by permutation, and adds the screened key clauses into the initial subsample set of the corresponding preset word length interval, to obtain the subsample set of the corresponding preset word length interval.

In one embodiment, the classification module 114 further:

segments each inputted text to be classified, and obtains the text length of the inputted text according to the number of words segmented from the inputted text;

determines whether the text length exceeds all of the preset word length intervals;

selects a text classification model corresponding to the preset word length interval in which the text length is located to classify the inputted text, if the text length does not exceed all of the preset word length intervals;

screens key clauses of the inputted text to obtain a target text, if the text length exceeds all of the preset word length intervals, wherein a text length of the target text is located in one of the preset word length intervals; and selects the text classification model corresponding to the preset word length interval in which the text length of the target text is located to classify the target text.

In one embodiment, the classification module 114 further:

screens the key clauses from the inputted text, to obtain multiple target texts respectively match each of the preset word length intervals;

inputs each of the target texts into a corresponding text classification model for text classification, to obtain a text classification result of each target text in the corresponding text classification model.

makes a vote for each category label in each text classification result, and determines the category label with the most votes as the final text classification result of the inputted text.

Further, if there are different candidate category labels with the same largest number of votes, the classification module 114 can determines the category label output by the text classification model corresponding to the maximum interval selected from the different candidate category labels as the final text classification result.

Figure 8:
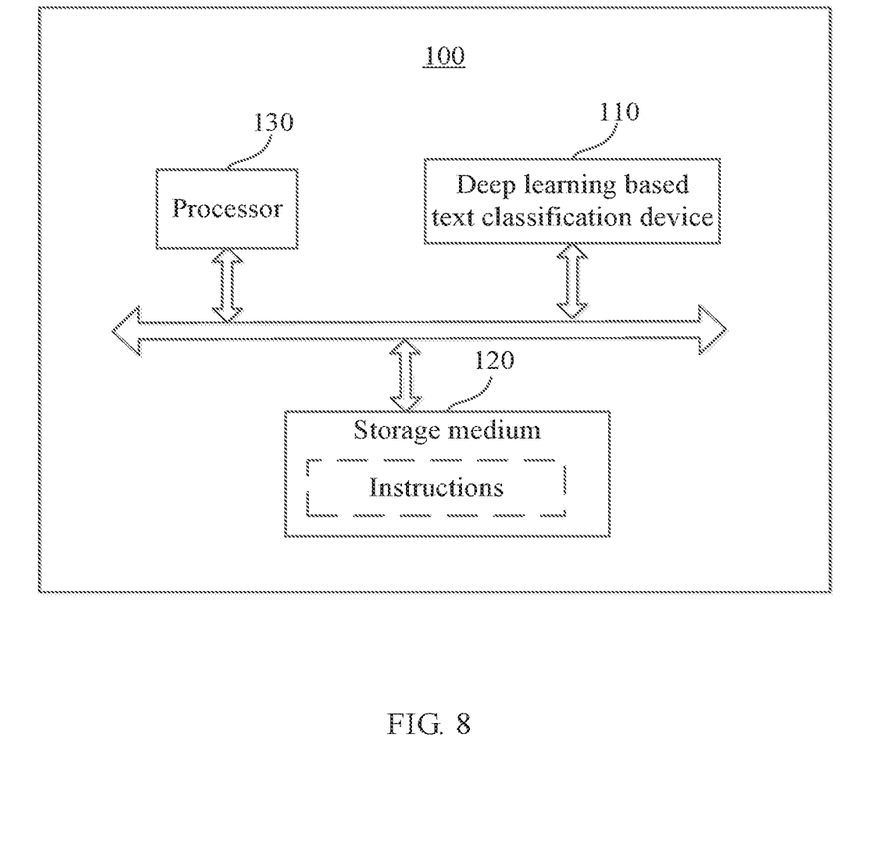
FIG. 8 illustrates a block diagram of a server including the deep learning based text classification apparatus to execute the deep learning based text classification method of FIG. 1.

Based on the same inventive concept, please refer to FIG. 8, a structural schematic block diagram of a server 100 for executing the above-mentioned deep learning based text classification method provided by an embodiment of the present application is shown. The server 100 may include a deep learning based text classification device 110, a storage medium 120, and processor 130.

In this embodiment, the storage medium 120 and the processor both are located in the server 100 and are separated from each other. However, it should be understood that, in other embodiments, the storage medium 120 may also be independent from the server 100 and can be accessed by the processor 130 through a bus interface. Alternatively, the storage medium 120 may also be integrated into the processor 130, for example, may be a cache and/or a general register.

The deep learning based text classification device 110 can include software functional modules (e.g., the construction module 111, the screening module 112, the training module 113, and the classification module 114) stored in the storage medium 120. When the software functional modules of the deep learning based text classification device 110 are executed by the processor 130, the text classification method provided before can be implemented.

The server 100 provided in the embodiment of the present application is another implementation form of the method embodiment, and the server 100 can be used to execute the deep learning based text classification method provided by the aforementioned method embodiment. For example, when the instructions stored in the storage medium 120 are executed by the processor, the deep learning based text classification method is implemented in the server 100. The technical effects of the server 100 can refer to the foregoing method embodiments, which will not be repeated here.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:

1. A deep learning based text classification method, executable by a server, comprising:

processing a training corpus set composed of a plurality of training corpora to construct a word weight table;

computing a clause weight of each of clauses in each training corpus, and screening key clauses of each training corpus according to the clause weight, to obtain a training sample set composed of the key clauses screened from each corpus;

acquiring subsample sets corresponding to different preset word length intervals from the training sample set, and respectively inputting the subsample sets into a deep learning model for training, to obtain text classification models respectively corresponding to the different preset word length intervals; and classifying inputted texts by using the text classification models; wherein a method of processing a training corpus set composed of a plurality of training corpora to construct a word weight table comprises:

acquiring a training corpus set, wherein each corpus of the training corpus set comprises texts to be trained and category labels of the texts to be trained;

segmenting each of the texts to be trained to obtain a word segmentation result of each text to be trained, wherein the word segmentation result is composed of multiple words;

calculating the Bayesian posterior probability of each of the words by using the Bayesian algorithm, wherein the Bayesian posterior probability represents the probability that when a target word appears, the text to be trained corresponding to the target word is each category label;

calculating the Bayesian posterior probability of each word, to obtain distribution of the category label probability of each word, and determining the variance of the category label probability distribution as the weight of each word, wherein the variance of the probability distribution indicates the degree of dispersion of the probability distribution of the category label, and if the degree of dispersion is greater, the distinguishing ability of the category label corresponding to the probability distribution is greater; and ranking the weight of each of the words to obtain a word weight table corresponding to the training corpus set.

2. The method of claim 1, wherein a method of computing a clause weight of each of clauses in each training corpus comprises:

segmenting each training corpus of the training corpus set to obtain at least one clause;

segmenting each clause to obtain a word segmentation result corresponding to each clause; and obtaining a word weight of each word in the word segmentation result of each clause from the word weight table, and determining the sum of the weight of each word as the clause weight of the corresponding clause.

3. The method of claim 1, wherein a method of screening key clauses of each training corpus according to the clause weight comprises:

calculating a text length of each training corpus, wherein the text length is the total number of words of all clauses in the training corpus;

determining all clauses of the training corpus as key clauses and merging the key clauses into a new corpus for outputting, if the text length of the training corpus is less than or equal to a preset length;

ranking the clauses of the training corpus according the clause weight of each clause if the text length of the training corpus is greater than the preset length and the number of the clauses is more than 1, and selecting the first N clauses as the key clauses and merging the key clauses into a new corpus for outputting; and removing the words that are outside of the preset length of the training corpus to obtain a new corpus for outputting, if the text length of the training corpus is greater than the preset length and the number of the clauses is 1.

4. The method of claim 1, wherein a method of acquiring subsample sets corresponding to different preset word length intervals from the training sample set comprises:

acquiring initial subsample sets of each preset word length interval of the training corpus set;

determining whether the difference between the number of samples with each category label in the initial subsample set of each preset word length interval and the number of samples of other category labels is greater than a preset number;

screening key clauses from the initial subsamples of every other preset word length intervals with the same category label by permutation, and adding the screened key clauses into the initial subsample set of the corresponding preset word length interval, to obtain the subsample set of the corresponding preset word length interval, if the difference corresponding to the category label is greater than the preset number.

5. The method of claim 1, wherein a method of classifying inputted texts by using the text classification models comprises:

segmenting each inputted text to be classified, and obtaining the text length of the inputted text according to the number of words segmented from the inputted text;

determining whether the text length exceeds all of the preset word length intervals;

selecting a text classification model corresponding to the preset word length interval in which the text length is located to classify the inputted text, if the text length does not exceed all of the preset word length intervals; and screening key clauses of the inputted text to obtain a target text, and selecting the text classification model corresponding to the preset word length interval in which the text length of the target text is located to classify the target text, if the text length exceeds all of the preset word length intervals, wherein a text length of the target text is located in one of the preset word length intervals.

6. The method of claim 1, wherein a method of classifying inputted texts by using the text classification models comprises:

screening the key clauses from the inputted text, to obtain multiple target texts respectively match each of the preset word length intervals;

inputting each of the target texts into a corresponding text classification model for text classification, to obtain a text classification result of each target text;

making a vote for each category label in each text classification result, and determining the category label with the most votes to be the final text classification result of the inputted text.

7. A server, comprising:

a processor; and a storage medium coupled to the processor and storing instructions for execution by the processor, cause the processor to:

process a training corpus set composed of a plurality of training corpora to construct a word weight table;

compute a clause weight of each of clauses in each training corpus, and screen key clauses of each training corpus according to the clause weight, to obtain a training sample set composed of the key clauses screened from each corpus;

acquire subsample sets corresponding to different preset word length intervals from the training sample set, and respectively input the subsample sets into a deep learning model for training, to obtain text classification models respectively corresponding to the different preset word length intervals; and classify inputted texts by using the text classification models; wherein the processor is further caused to:

acquire a training corpus set, wherein each corpus of the training corpus set comprises texts to be trained and category labels of the texts to be trained;

segment each of the texts to be trained to obtain a word segmentation result of each text to be trained, wherein the word segmentation result is composed of multiple words;

calculate the Bayesian posterior probability of each of the words by using the Bayesian algorithm, wherein the Bayesian posterior probability represents the probability that when a target word appears, the text to be trained corresponding to the target word is each category label;

calculate the Bayesian posterior probability of each word, to obtain distribution of the category label probability of each word, and determine the variance of the category label probability distribution as the weight of each word, wherein the variance of the probability distribution indicates the degree of dispersion of the probability distribution of the category label, and if the degree of dispersion is greater, the distinguishing ability of the category label corresponding to the probability distribution is greater; and rank the weight of each of the words to obtain a word weight table corresponding to the training corpus set.

8. The server of claim 7, wherein the processor is further caused to:

segment each training corpus of the training corpus set to obtain at least one clause;

segment each clause to obtain a word segmentation result corresponding to each clause; and obtain a weight of each word in the word segmentation result of each clause from the word weight table, and determine the sum of the weight of each word as the clause weight of the corresponding clause.

9. The server of claim 7, wherein the processor is further caused to:

calculate a text length of each training corpus, wherein the text length is the total number of words of all clauses in the training corpus;

determine all clauses of the training corpus as key clauses and merge the key clauses into a new corpus for outputting, if the text length of the training corpus is less than or equal to a preset length;

rank the clauses of the training corpus according the clause weight of each clause if the text length of the training corpus is greater than the preset length and the number of the clauses is more than 1, and select the first N clauses as the key clauses and merge the key clauses into a new corpus for outputting; and remove the words that are outside of the preset length of the training corpus to obtain a new corpus for outputting, if the text length of the training corpus is greater than the preset length and the number of the clauses is 1.

10. The server of claim 7, wherein the processor is further caused to:

acquire initial subsample sets of each preset word length interval of the training corpus set;

determine whether the difference between the number of samples with each category label in the initial subsample set of each preset word length interval and the number of samples of other category labels is greater than a preset number;

screen key clauses from the initial subsamples of every other preset word length intervals with the same category label by permutation, and add the screened key clauses into the initial subsample set of the corresponding preset word length interval, to obtain the subsample set of the corresponding preset word length interval, if the difference corresponding to the category label is greater than the preset number.

11. The server of claim 7, wherein the processor is further caused to:

segment each inputted text to be classified, and obtaining the text length of the inputted text according to the number of words segmented from the inputted text;

determine whether the text length exceeds all of the preset word length intervals;

select a text classification model corresponding to the preset word length interval in which the text length is located to classify the inputted text, if the text length does not exceed all of the preset word length intervals; and screen key clauses of the inputted text to obtain a target text, and select the text classification model corresponding to the preset word length interval in which the text length of the target text is located to classify the target text, if the text length exceeds all of the preset word length intervals, wherein a text length of the target text is located in one of the preset word length intervals.

12. The server of claim 7, wherein the processor is further caused to:

screen the key clauses from the inputted text, to obtain multiple target texts respectively match each of the preset word length intervals;

input each of the target texts into a corresponding text classification model for text classification, to obtain a text classification result of each target text;

make a vote for each category label in each text classification result, and determine the category label with the most votes to be the final text classification result of the inputted text.

13. A non-transitory storage medium having instructions stored herein, when the instructions are executed by a processor of a server, the processor is configured to perform a deep learning based text classification method, wherein the method comprises:

processing a training corpus set composed of a plurality of training corpora to construct a word weight table;

computing a clause weight of each of clauses in each training corpus, and screening key clauses of each training corpus according to the clause weight, to obtain a training sample set composed of the key clauses screened from each corpus;

acquiring subsample sets corresponding to different preset word length intervals from the training sample set, and respectively inputting the subsample sets into a deep learning model for training, to obtain text classification models respectively corresponding to the different preset word length intervals; and classifying inputted texts by using the text classification models; wherein a method of processing a training corpus set composed of a plurality of training corpora to construct a word weight table comprises:

acquiring a training corpus set, wherein each corpus of the training corpus set comprises texts to be trained and category labels of the texts to be trained;

segmenting each of the texts to be trained to obtain a word segmentation result of each text to be trained, wherein the word segmentation result is composed of multiple words;

calculating the Bayesian posterior probability of each of the words by using the Bayesian algorithm, wherein the Bayesian posterior probability represents the probability that when a target word appears, the text to be trained corresponding to the target word is each category label;

calculating the Bayesian posterior probability of each word, to obtain distribution of the category label probability of each word, and determining the variance of the category label probability distribution as the weight of each word, wherein the variance of the probability distribution indicates the degree of dispersion of the probability distribution of the category label, and if the degree of dispersion is greater, the distinguishing ability of the category label corresponding to the probability distribution is greater; and ranking the weight of each of the words to obtain a word weight table corresponding to the training corpus set.

14. The non-transitory storage medium of claim 13, wherein a method of screening key clauses of each training corpus according to the clause weight comprises:

calculating a text length of each training corpus, wherein the text length is the total number of words of all clauses in the training corpus;

determining all clauses of the training corpus as key clauses and merging the key clauses into a new corpus for outputting, if the text length of the training corpus is less than or equal to a preset length;

ranking the clauses of the training corpus according the clause weight of each clause if the text length of the training corpus is greater than the preset length and the number of the clauses is more than 1, and selecting the first N clauses as the key clauses and merging the key clauses into a new corpus for outputting; and removing the words that are outside of the preset length of the training corpus to obtain a new corpus for outputting, if the text length of the training corpus is greater than the preset length and the number of the clauses is 1.

15. The non-transitory storage medium of claim 13, wherein a method of acquiring subsample sets corresponding to different preset word length intervals from the training sample set comprises:

acquiring initial subsample sets of each preset word length interval of the training corpus set;

determining whether the difference between the number of samples with each category label in the initial subsample set of each preset word length interval and the number of samples of other category labels is greater than a preset number;

screening key clauses from the initial subsamples of every other preset word length intervals with the same category label by permutation, and adding the screened key clauses into the initial subsample set of the corresponding preset word length interval, to obtain the subsample set of the corresponding preset word length interval, if the difference corresponding to the category label is greater than the preset number.

16. The non-transitory storage medium of claim 13, wherein a method of classifying inputted texts by using the text classification models comprises:

segmenting each inputted text to be classified, and obtaining the text length of the inputted text according to the number of words segmented from the inputted text;

determining whether the text length exceeds all of the preset word length intervals;

selecting a text classification model corresponding to the preset word length interval in which the text length is located to classify the inputted text, if the text length does not exceed all of the preset word length intervals; and screening key clauses of the inputted text to obtain a target text, and selecting the text classification model corresponding to the preset word length interval in which the text length of the target text is located to classify the target text, if the text length exceeds all of the preset word length intervals, wherein a text length of the target text is located in one of the preset word length intervals.

17. The non-transitory storage medium of claim 13, wherein a method of classifying inputted texts by using the text classification models comprises:

screening the key clauses from the inputted text, to obtain multiple target texts respectively match each of the preset word length intervals;

inputting each of the target texts into a corresponding text classification model for text classification, to obtain a text classification result of each target text;

making a vote for each category label in each text classification result, and determining the category label with the most votes to be the final text classification result of the inputted text.

* * * * *